(12) United States Patent
Yang et al.

(10) Patent No.: US 9,253,766 B2
(45) Date of Patent: Feb. 2, 2016

(54) METHOD FOR SETTING SUBFRAME IN WIRELESS COMMUNICATION SYSTEM

(75) Inventors: Suckchel Yang, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 160 days.

(21) Appl. No.: 14/118,989

(22) PCT Filed: Jul. 23, 2012

(86) PCT No.: PCT/KR2012/005864
§ 371 (c)(1),
(2), (4) Date: Nov. 20, 2013

(87) PCT Pub. No.: WO2013/015587
PCT Pub. Date: Jan. 31, 2013

(65) Prior Publication Data
US 2014/0092793 A1  Apr. 3, 2014

Related U.S. Application Data

(60) Provisional application No. 61/510,496, filed on Jul. 22, 2011.

(51) Int. Cl.
| | |
|---|---|
| H04W 72/04 | (2009.01) |
| H04L 5/00 | (2006.01) |
| H04L 5/14 | (2006.01) |
| H04B 7/26 | (2006.01) |
| H04L 27/26 | (2006.01) |
| H04L 1/18 | (2006.01) |
| H04L 1/00 | (2006.01) |

(52) U.S. Cl.
CPC ......... *H04W 72/0413* (2013.01); *H04B 7/2656* (2013.01); *H04L 1/0073* (2013.01); *H04L 5/0055* (2013.01); *H04L 5/14* (2013.01); *H04L 27/2602* (2013.01); *H04L 27/2627* (2013.01); *H04L 1/0026* (2013.01); *H04L 1/1861* (2013.01)

(58) Field of Classification Search
None
See application file for complete search history.

(56) References Cited

U.S. PATENT DOCUMENTS

| | | | |
|---|---|---|---|
| 2009/0097434 A1 | 4/2009 | Leng et al. | |
| 2010/0124184 A1* | 5/2010 | Dayal et al. | 370/280 |

(Continued)

FOREIGN PATENT DOCUMENTS

| | | |
|---|---|---|
| KR | 10-2008-0113266 A | 12/2008 |
| KR | 10-2009-0112574 A | 10/2009 |

(Continued)

*Primary Examiner* — Charles C Jiang
*Assistant Examiner* — George Atkins, Jr.
(74) *Attorney, Agent, or Firm* — Birch, Stewart, Kolasch & Birch, LLP

(57) ABSTRACT

A method of configuring a subframe in a time division duplexing (TDD) wireless communication system, and an apparatus therefore are discussed. The method according to one embodiment includes receiving reconfiguration information indicating a specific subframe being reconfigured. The specific subframe is one of one or more uplink subframes based on a TDD uplink-downlink configuration. The method according to the embodiment further includes reconfiguring the specific subframe based on the reconfiguration information. When the specific subframe is reconfigured to use for both an uplink transmission and a downlink transmission, a first resource region for the uplink transmission is allocated before a second resource region for the downlink transmission.

8 Claims, 12 Drawing Sheets

(56) References Cited

U.S. PATENT DOCUMENTS

| | | |
|---|---|---|
| 2011/0032855 A1 | 2/2011 | Kim et al. |
| 2011/0038302 A1* | 2/2011 | Papasakellariou et al. ... 370/315 |
| 2011/0051681 A1 | 3/2011 | Ahn et al. |
| 2011/0268135 A1 | 11/2011 | Kim et al. |
| 2012/0039279 A1* | 2/2012 | Chen et al. ................ 370/329 |

FOREIGN PATENT DOCUMENTS

| | | |
|---|---|---|
| KR | 10-2010-0019957 A | 2/2010 |
| KR | 10-2010-0026970 A | 3/2010 |

* cited by examiner

METHOD FOR SETTING SUBFRAME IN WIRELESS COMMUNICATION SYSTEM

CROSS REFERENCE TO RELATED APPLICATIONS

This application is the National Phase of PCT/KR2012/005864 filed on Jul. 23, 2012, which claims priority under 35 U.S.C. 119(e) to U.S. Provisional Application No. 61/510,496 filed on Jul. 22, 2011, all of which are hereby expressly incorporated by reference into the present application.

TECHNICAL FIELD

The present invention relates to a wireless communication system and, more particularly, to a method and apparatus for transmitting and receiving a signal between a user equipment (UE) and a base station in a wireless communication system.

BACKGROUND ART

Wireless communication systems have been diversified in order to provide various types of communication services such as voice or data service. In general, a wireless communication system is a multiple access system capable of sharing available system resources (bandwidth, transmit power or the like) so as to support communication with multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and the like.

DISCLOSURE

Technical Problem

An object of the present invention devised to solve the problem lies in a method and apparatus for transmitting and receiving a signal between a user equipment (UE) and a base station in a wireless communication system.

The technical problems solved by the present invention are not limited to the above technical problems and other technical problems which are not described herein will become apparent to those skilled in the art from the following description.

Technical Solution

The object of the present invention can be achieved by providing a method of configuring a subframe in a time division duplexing (TDD) wireless communication system including configuring one or more uplink subframes and one or more downlink subframes according to an uplink-downlink (UL-DL) configuration, receiving reconfiguration information of a specific uplink subframe among the one or more uplink subframes, and configuring the specific subframe to include a first region for uplink and a second region for downlink based on the received reconfiguration information.

In another aspect of the present invention, provided herein is an apparatus for configuring a subframe in a time division duplexing (TDD) wireless communication system including a radio frequency (RF) unit and a processor, wherein the processor configures one or more uplink subframes and one or more downlink subframes according to an uplink-downlink (UL-DL) configuration, receives reconfiguration information of a specific uplink subframe among the one or more uplink subframes and configures the specific subframe to include a first region for uplink and a second region for downlink based on the received reconfiguration information.

The first region may be configured in a front portion of the specific uplink subframe and the second region may be configured in a rear portion of the specific uplink subframe. The method may further include transmitting an acknowledgement (ACK)/negative ACK (NACK) signal in the first region, and the ACK/NACK signal may be transmitted using a plurality of physical uplink control channel (PUCCH) resources. The method may further include transmitting an acknowledgement (ACK)/negative ACK (NACK) signal in the first region, and the ACK/NACK signal may be transmitted using physical uplink shared channel (PUSCH) resources pre-allocated to the specific uplink subframe. The method may further include receiving a physical downlink shared channel (PDSCH) in the second region, and an index of a last orthogonal frequency division multiplexing (OFDM) symbol on which the PDSCH is received in the second region may be changed depending upon whether the specific uplink subframe is configured for sounding reference signal (SRS) transmission.

Further, the first region may be configured in a rear portion of the specific uplink subframe, the second region may be configured in a front portion of the specific uplink subframe, and the specific uplink subframe may be configured to further include a switching gap time for signal transmission/reception switching between the first region and the second region.

Advantageous Effects

According to the present invention, it is possible to efficiently secure and manage resources by dynamically applying available downlink resources for transmitting a signal from a base station to a user equipment (UE) in a wireless communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

The following technologies can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied as wireless (or radio) technology such as UTRA (Universal Terrestrial Radio Access) or CDMA2000. TDMA may be embodied as wireless (or radio) technology such as GSM (Global System for Mobile communications)/GPRS (General Packet Radio Service)/EDGE (Enhanced Data Rates for GSM Evolution). OFDMA may be embodied as wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of E-UMTS (Evolved UMTS), which uses E-UTRA. 3GPP LTE employs the OFDMA in downlink and employs the SC-FDMA in uplink. LTE-Advanced (LTE-A) is an evolved version of 3GPP LTE.

For clarity, the following description focuses on 3GPP LTE and LTE-A. However, the technical spirit of the present invention is not limited thereto. It should be noted that specific terms used in the following description are proposed for the convenience of description and better understanding of the present invention, and the use of these specific terms may be changed to another format within the technical scope or spirit of the present invention.

In a wireless communication system, a user equipment (UE) receives information from a base station in downlink (DL) and transmits information to the base station in uplink (UL). The information transmitted and received between the base station and the user equipment includes data and a variety of control information and a physical channel varies according to type/usage of the transmitted and received information.

Figure 1:
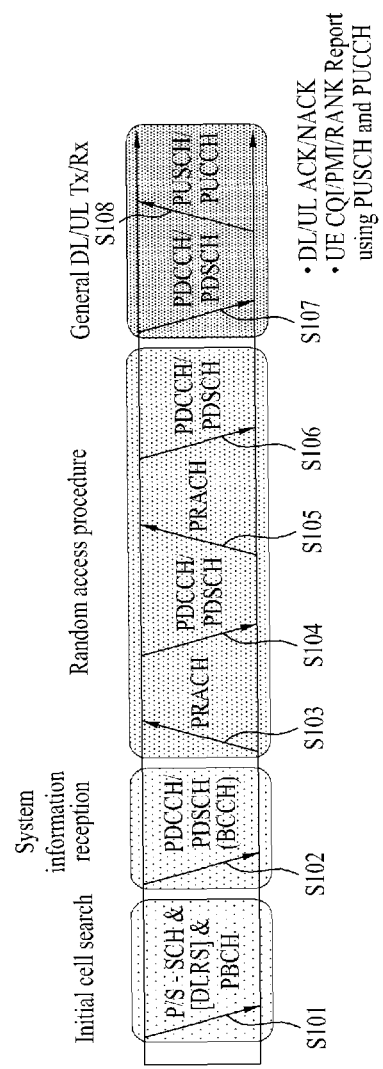
FIG. 1 is a view showing physical channels used for a $3^{rd}$ Generation Partnership Project (3GPP) Long Term Evolution (LTE) system and a general signal transmission method using the same.

FIG. 1 is a diagram showing physical channels used for a $3^{rd}$ Generation Partnership Project (3GPP) Long Term Evolution (LTE) system and a general signal transmission method using the same.

When a UE is powered on or when the UE newly enters a cell, the UE performs an initial cell search operation such as synchronization with a BS in step S101. For the initial cell search operation, the UE may receive a Primary Synchronization Channel (P-SCH) and a Secondary Synchronization Channel (S-SCH) from the BS so as to perform synchronization with the BS, and acquire information such as a cell ID. Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE which has completed initial cell search may receive a Physical Downlink Control Channel (PDCCH) and a Physical Downlink Shared Channel (PDSCH) corresponding to the PDCCH, and acquire more detailed system information in step S102.

Thereafter, the UE may perform a random access procedure in steps S103 to S106, in order to complete access to the BS. For the random access procedure, the UE may transmit a preamble via a Physical Random Access Channel (PRACH) (S103), and may receive a message in response to the preamble via the PDCCH and the PDSCH corresponding thereto (S104). In contention-based random access, a contention resolution procedure including the transmission of an additional PRACH (S105) and the reception of the PDCCH and the PDSCH corresponding thereto (S106) may be performed.

The UE which has performed the above-described procedure may then receive the PDCCH/PDSCH (S107) and transmit a Physical Uplink Shared Channel (PUSCH)/Physical Uplink Control Channel (PUCCH) (S108), as a general uplink/downlink signal transmission procedure. Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel state information (CSI), etc. In the present specification, HARQ ACK/NACK is briefly referred to as HARQ-ACK or ACK/NACK (A/N). HARQ-ACK includes at least one of positive ACK (briefly referred to as ACK), negative ACK (NACK), DTX and NACK/DTX. The CSI includes channel quality indicator (CQI), precoding matrix indicator (PMI), rank indicator (RI), etc. In general, although a UCI is periodically transmitted via a PUCCH, the UCI may be transmitted through a PUSCH if control information and traffic data are simultaneously transmitted. In addition, UCI may be aperiodically transmitted via a PUSCH according to a network request/instruction.

Figure 2:
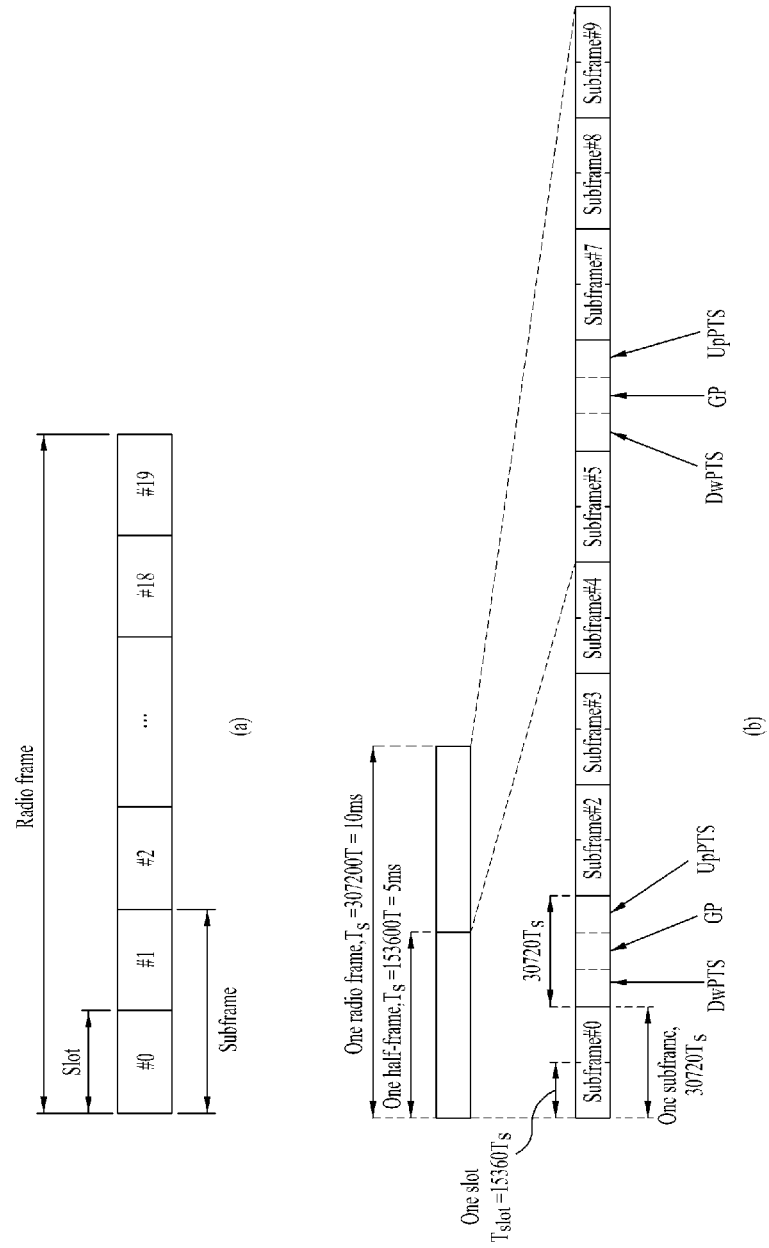
FIG. 2 is a diagram showing the structure of a radio frame.

FIG. 2 is a diagram showing the structure of a radio frame. In a cellular OFDM radio packet communication system, uplink/downlink data packet transmission is performed in subframe units and one subframe is defined as a predetermined time interval including a plurality of OFDM symbols. The 3GPP LTE standard supports radio frame structure type 1 applicable to frequency division duplexing (FDD) and radio frame structure type 2 applicable to time division duplexing (TDD).

FIG. 2(*a*) shows the structure of radio frame structure type 1. A downlink radio frame includes 10 subframes and one subframe includes two slots in a time domain. A time required to transmit one subframe is referred to as a transmission time interval (TTI). For example, the length of one subframe may be 1 ms and the length of one slot may be 0.5 ms. One slot includes a plurality of OFDM symbols in a time domain and includes a plurality of resource blocks (RBs) in a frequency domain. In a 3GPP LTE system, since OFDM is used in downlink, an OFDM symbol indicates one symbol interval. The OFDM symbol may be referred to as an SC-FDMA symbol or symbol interval. A resource block (RB) as a resource allocation unit may include a plurality of consecutive subcarriers in one slot.

The number of OFDM symbols included in one slot may be changed according to the configuration of a Cyclic Prefix (CP). The CP includes an extended CP and a normal CR. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the normal CP. In case of the extended CP, for example, the number of OFDM symbols included in one slot may be six. If a channel state is unstable, for example, if a user equipment (UE) moves at a high speed, the extended CP may be used in order to further reduce inter-symbol interference.

In case of using the normal CP, since one slot includes seven OFDM symbols, one subframe includes 14 OFDM symbols. At this time, the first at most three OFDM symbols of each subframe may be allocated to a Physical Downlink Control Channel (PDCCH) and the remaining OFDM symbols may be allocated to a Physical Downlink Shared Channel (PDSCH).

FIG. 2(b) is a diagram showing the structure of radio frame structure type 2. Radio frame structure type 2 includes two half frames. Each half frame includes four general subframes including two slots and special subframes including a downlink pilot time slot (DwPTS), a guard period (GP) and an uplink pilot time slot (UpPTS).

In the special subframes, the DwPTS is used for initial cell search, synchronization and channel estimation at a UE. The UpPTS is used for channel estimation at a BS and uplink transmission synchronization of a UE. That is, the DwPTS is used for downlink transmission and the UpPTS is used for uplink transmission. In particular, the UpPTS is used for PRACH preamble or SRS transmission. The guard period is used to eliminate interference occurring in uplink due to multi-path delay of a downlink signal between uplink and downlink.

In the current 3GPP standard for the special subframes, configurations shown in Table 1 below are defined. In Table 1, the region excluding the DwPTS and the UpPTS is configured as the guard period.

$T_s = 1/(15000*2048)$.

In Table 2, D denotes a downlink subframe, U denotes an uplink subframe, and S denotes a special subframe.

The structure of the radio frame is only exemplary. Accordingly, the number of subframes included in the radio frame, the number of slots included in the subframe or the number of symbols included in the slot may be changed in various manners.

Figure 3:
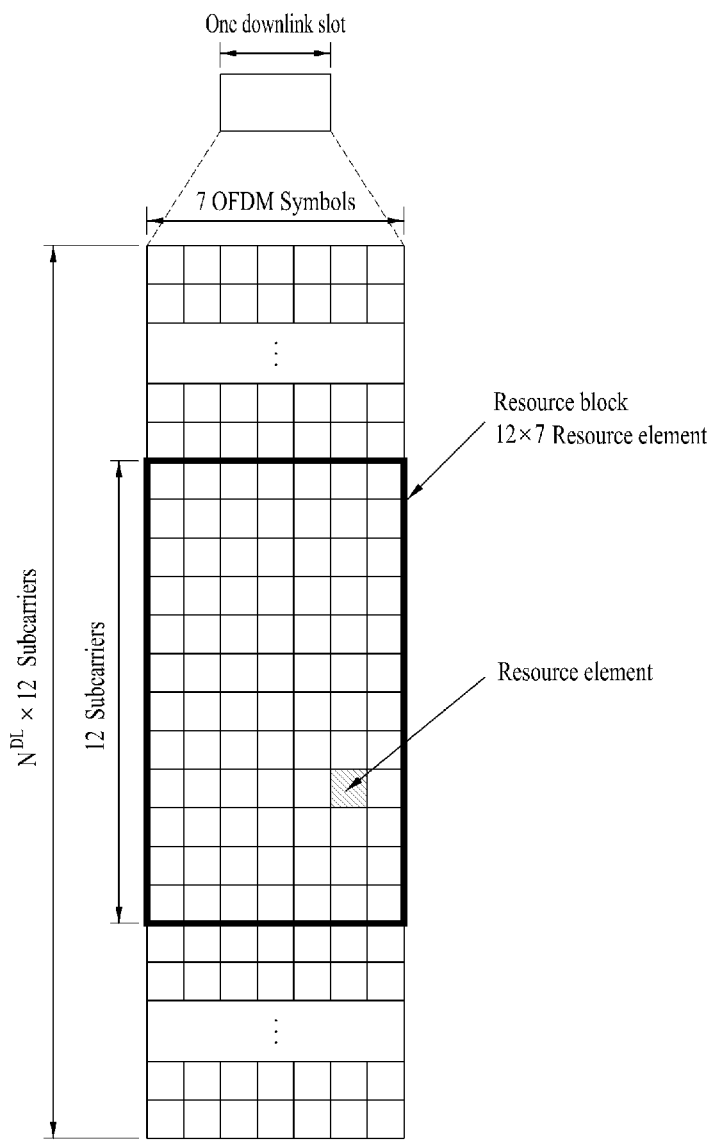
FIG. 3 is a diagram showing a resource grid of a downlink slot.

FIG. 3 is a diagram showing a resource grid of a downlink slot.

Referring to FIG. 3, a downlink slot includes a plurality of OFDM symbols in a time domain. One downlink slot may include seven (six) OFDM symbols and one RB may include 12 subcarriers in a frequency domain. Each element on the resource grid is referred to as a resource element (RE). One RB includes 12×7(6) REs. The number $N_{RB}$ of RBs included in a downlink slot depends on a downlink transmission bandwidth. The structure of the uplink slot may be equal to the structure of the downlink slot, except that an OFDM symbol is replaced with an SC-FDMA symbol.

Figure 4:
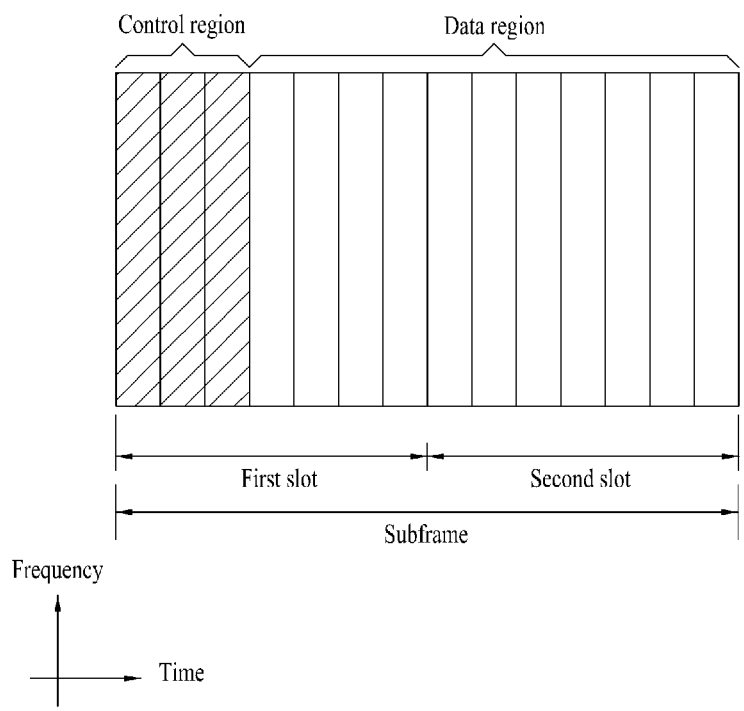
FIG. 4 is a diagram showing the structure of a downlink subframe.

FIG. 4 is a diagram showing the structure of a downlink subframe.

Referring to FIG. 4, a maximum of three (four) OFDM symbols of a front portion of a first slot of one subframe corresponds to a control region to which a control channel is allocated. The remaining OFDM symbols correspond to a data region to which a Physical Downlink Shared Channel (PDSCH) is allocated. Examples of the downlink control channels used in LTE include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted on a first OFDM symbol of a subframe, and carries information about the number of OFDM symbols used

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

In the structure of radio frame structure type 2 (that is, TDD system), the subframe configuration of the uplink/downlink (UL/DL) configuration is shown in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D | to transmit the control channel within the subframe. The PHICH carries a HARQ ACK/NACK signal in response to uplink transmission.

The control information transmitted through the PDCCH is referred to as Downlink Control Information (DCI). DCI includes resource allocation information and other control information of a UE or a UE group. For example, DCI includes uplink or downlink scheduling information, an uplink transmit (Tx) power control command, etc.

The PDCCH may carry transmission format and resource allocation information of a Downlink Shared Channel (DL-SCH), transmission format and resource allocation information of an Uplink Shared Channel (UL-SCH), paging information on a Paging Channel (PCH), system information on the DL-SCH, resource allocation information of a higher layer control message such as a Random Access Response (RAR) transmitted on the PDSCH, a set of transmit (Tx) power control commands for individual UEs within a UE group, a Tx power control command, information indicating activation of Voice over IP (VoIP), etc. A plurality of PDCCHs may be transmitted in the control region. The UE may monitor the plurality of PDCCHs. The PDCCHs are transmitted on an aggregate of one or several consecutive control channel elements (CCEs). The CCE is a logical allocation unit used to provide the PDCCHs with a coding rate based on the state of a radio channel. The CCE corresponds to a plurality of resource element groups (REGs). The format of the PDCCH and the number of available bits are determined based on the number of CCEs. The BS determines a PDCCH format according to DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information RNTI (SI-RNTI) may be masked to the CRC. If the PDCCH is for random access response, a random access-RNTI (RA-RNTI) may be masked to the CRC.

Figure 5:
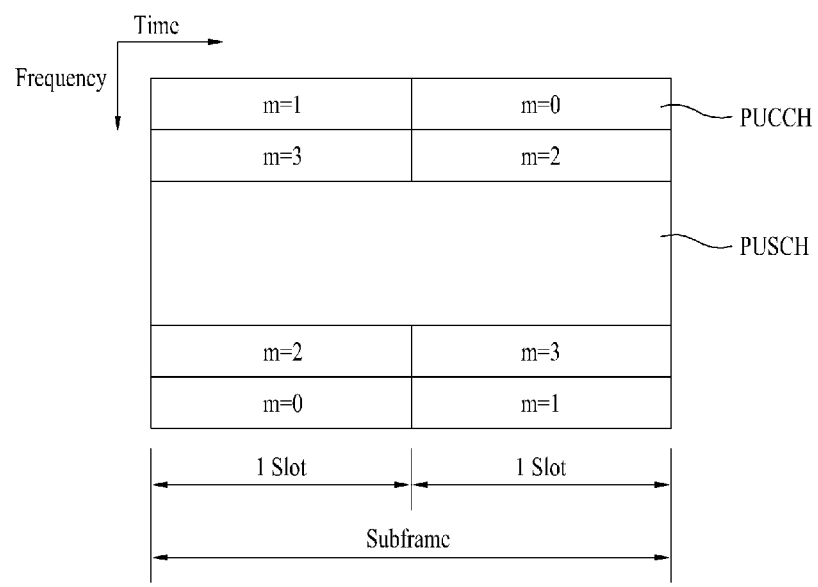
FIG. 5 is a diagram showing the structure of an uplink subframe.

FIG. 5 is a diagram showing the structure of an uplink subframe used in LTE.

Referring to FIG. 5, the uplink subframe includes a plurality (e.g., 2) of slots. The slot may include SC-FDMA symbols, the number of which is changed according to CP length. The uplink subframe may be divided into a control region and a data region in a frequency domain. The data region includes a PUSCH and is used to transmit a data signal such as voice. The control region includes a PUCCH and is used to transmit uplink control information (UCI). The PUCCH includes an RB pair located at both ends of the data region on a frequency axis and is hopped at a slot boundary.

The PUCCH may be used to transmit the following control information.
  Scheduling request (SR): Information used to request uplink (UL)-SCH resources. This is transmitted using an on-off keying (OOK) method.
  HARQ ACK/NACK: Response signal to downlink data packets on a PDSCH. This indicates whether downlink data packets have been successfully received. 1-bit ACK/NACK is transmitted in response to a single downlink codeword and 2-bit ACK/NACK is transmitted in response to two downlink codewords.
  Channel state information (CSI): Feedback information for a downlink channel. The CSI includes channel quality indicator (CQI) and Multiple input multiple output (MIMO)-related feedback information includes rank indicator (RI), precoding matrix indicator (PMI), precoding type indicator (PTI), etc. 20 bits are used per subframe.

The amount of control information (UCI) transmittable by a UE in a subframe depends on the number of SC-FDMA symbols available in control information transmission. The SC-FDMA symbols available in control information transmission mean SC-FDMA symbols excluding SC-FDMA symbols for reference signal transmission in a subframe, and a last SC-FDMA symbol of the subframe is also excluded in case of a subframe in which a sounding reference signal (SRS) is set. A reference signal is used for coherent detection of a PUCCH.

Figure 6:
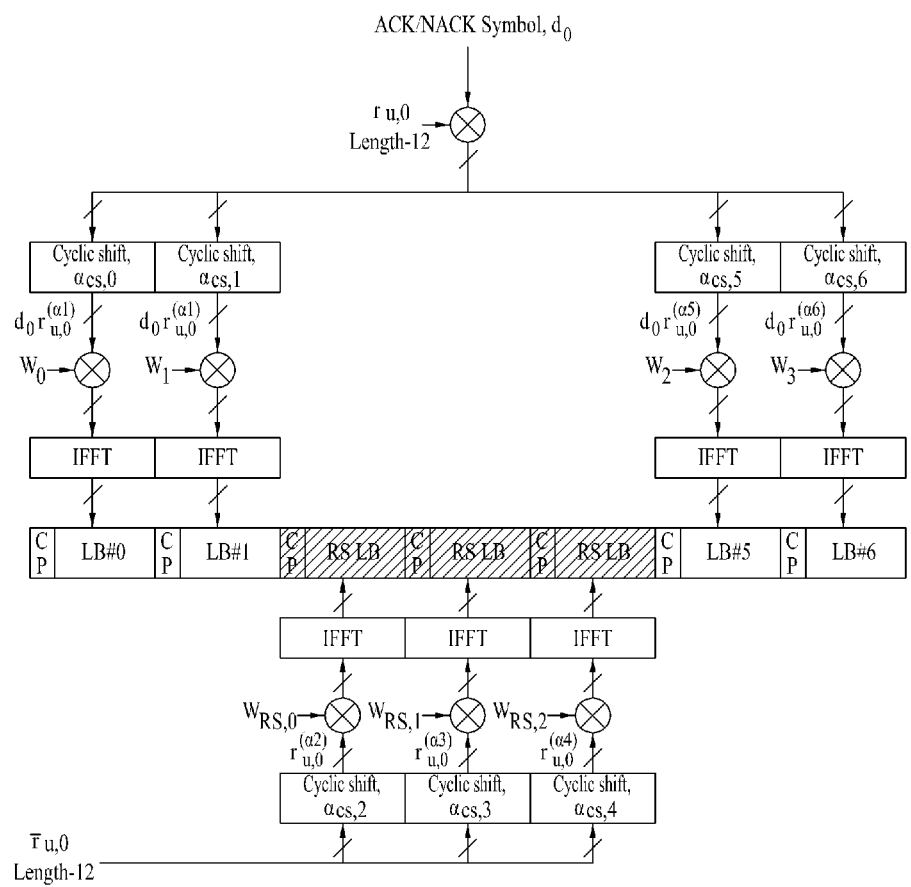
FIG. 6 is a diagram showing a slot level structure of PUCCH format 1a/1b.

FIG. 6 is a diagram showing a slot level structure of PUCCH format 1a/1b. PUCCH format 1a/1b is used for ACK/NACK transmission. In the case of a normal CP, SC-FDMA #2/#3/#4 is used for demodulation reference signal (DM RS) transmission. In the case of an extended CP, SC-FDMA #2/#3 is used for DM RS transmission. Accordingly, in a slot, four SC-FDMA symbols are used for ACK/NACK transmission. For convenience, PUCCH format 1a/1b is referred to as PUCCH format 1.

Referring to FIG. 6, 1-bit [b(0)] ACK/NACK information and 2-bit [b(0)b(1)] ACK/NACK information are respectively modulated according to BPSK and QPSK and one ACK/NACK modulation symbol is generated ($d_0$). In ACK/NACK information, each bit [b(i),i=0, 1] indicates a HARQ response to a corresponding DL transport block, is 1 in case of positive ACK and is 0 in case of negative ACK (NACK). Table 3 shows a modulation table defined for PUCCH formats 1a and 1b in legacy LTE.

TABLE 3

| PUCCH format | b(0), . . . , b($M_{bit}$ − 1) | d(0) |
| --- | --- | --- |
| 1a | 0 | 1 |
|    | 1 | −1 |
| 1b | 00 | 1 |
|    | 01 | −j |
|    | 10 | j |
|    | 11 | −1 |

In PUCCH format 1a/1b, cyclic shift $\alpha_{cs,x}$ is performed in a frequency domain and spreading is performed using orthogonal spread code (e.g., Walsh-Hadamard or DFT code) $w_0, w_1, w_2, w_3$ in the time domain. Since code multiplexing is used in both the frequency and time domains, more UEs may be multiplexed on the same PUCCH RB.

RSs transmitted from different UEs are multiplexed using the same method as UCI. The number of cyclic shifts supported at SC-FDMA symbols for PUCCH ACK/NACK RBs may be configured by a cell-specific higher layer signaling parameter $\Delta_{shift}^{PUCCI}$. $\Delta_{shift}^{PUCCH} \square \{1, 2, 3\}$ indicates that shift values are respectively 12, 6 and 4. The number of spread codes actually used for ACK/NACK in time-domain CDM may be restricted by the number of RS symbols. This is because multiplexing capacity of RS symbols is less than that of UCI symbols due to a small number of RS symbols.

Figure 7:
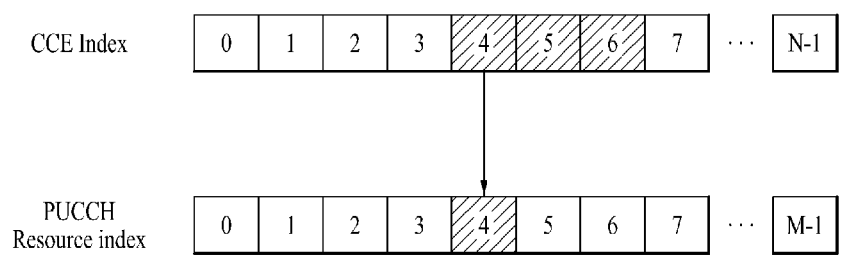
FIG. 7 is a diagram showing an example of determining PUCCH resources for ACK/NACK.

FIG. 7 is a diagram showing an example of determining PUCCH resources for ACK/NACK. In an LTE system, PUCCH resources for ACK/NACK are not allocated to each UE in advance but a plurality of PUCCH resources are divided and used by a plurality of UEs in a cell each time. More specifically, PUCCH resources used for a UE to transmit ACK/NACK correspond to a PDCCH carrying scheduling information of downlink data. In each downlink subframe, an overall region in which a PDCCH is transmitted is composed of a plurality of control channel elements (CCEs) and a PDCCH transmitted to a UE is composed of one or more CCEs. A UE transmits ACK/NACK via PUCCH resources corresponding to a specific CCE (e.g., a first CCE) among CCEs configuring a PDCCH received thereby.

Referring to FIG. 7, each rectangle denotes a CCE in a downlink component carrier (DL CC) and each rectangle denotes PUCCH resources in an uplink component carrier (UL CC). Each PUCCH index corresponds to PUCCH resources for ACK/NACK. As shown in FIG. 7, if it is assumed that information about a PDSCH is delivered via a PDCCH composed of fourth to sixth CCEs, the UE transmits ACK/NACK via a fourth PUCCH corresponding to the fourth CCE which configures a first CCE of the PDCCH. FIG. 7 shows the case in which a maximum of M PUCCHs is present in a UL CC when a maximum of N CCEs is present in a DL CC. Although N=M, the M value and the N value may differ and mapping of CCEs and PUCCHs may overlap.

More specifically, in an LTE system, a PUCCH resource index is determined as follows.

$$n^{(1)}_{PUCCH} = n_{CCE} + N^{(1)}_{PUCCH} \qquad \text{Equation 1}$$

where, $n^{(1)}_{PUCCH}$ denotes a resource index of PUCCH format 1 for transmitting ACK/NACK/DTX, $N^{(1)}_{PUCCH}$ denotes a signaling value received from a higher layer, and $n_{CCE}$ denotes the smallest value among CCE indices used for PDCCH transmission. Cyclic shift, orthogonal spread code and physical resource block (PRB) for PUCCH format 1a/1b are obtained from $n^{(1)}_{PUCCH}$.

When an LTE system operates in a TDD mode, a UE transmits one multiplexed ACK/NACK signal in response to a plurality of PDSCHs received via different subframes. The method of transmitting ACK/NACK in response to the plurality of PDSCHs is divided as follows.

1) ACK/NACK bundling: ACK/NACK bits for a plurality of data units (e.g., PDSCH, SPS release PDCCH, etc.) are combined by a logical AND operation, for example. For example, if all data units have been successfully decoded, an Rx node (e.g., UE) transmits an ACK signal. In contrast, if decoding (or detection) of at least one data unit fails, the Rx node transmits a NACK signal or does not transmit a signal.

2) PUCCH selection: The UE, which has received a plurality of PDSCHs, occupies a plurality of PUCCH resources for ACK/NACK transmission. An ACK/NACK response to a plurality of data units is identified by a combination of PUCCH resources used for actual ACK/NACK transmission and transmitted ACK/NACK content (e.g., bit value). This is referred to as an ACK/NACK selection scheme.

PUCCH selective transmission will be described in detail. In the PUCCH selective transmission method, the UE occupies a plurality of uplink physical channel resources in order to transmit a multiplexed ACK/NACK signal if a plurality of pieces of downlink data is received. For example, if a plurality of PDSCHs is received, the UE may occupy PUCCH resources, the number of which is equal to the number of PDSCHs, using specific CCEs of PDCCHs respectively indicating the PDSCHs. In this case, a multiplexed ACK/NACK signal may be transmitted using a combination of information indicating which of the plurality of occupied PUCCH resources is selected and a modulation/coding scheme applied to the selected PUCCH resources.

Table 4 shows a PUCCH selection transmission method defined in LTE.

TABLE 4

| HARQ-ACK(0), HARQ-ACK(1), HARQ-ACK(2), HARQ-ACK(3) | Subframe | |
|---|---|---|
| | $n^{(1)}_{PUCCH,i}$ | b(0), b(1) |
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

In Table 4, HARQ-ACK(i) denotes a HARQ ACK/NACK/DTX result of an i-th data unit (0≤i≤3). The HARQ ACK/NACK/DTX result includes ACK, NACK, DTX and NACK/DTX. NACK/DTX denotes NACK or DTX. ACK and NACK indicate decoding success and failure of a transport block (which is equivalent to a code block) transmitted via a PDSCH, respectively. Discontinuous transmission (DTX) indicates PDCCH detection failure. A maximum of four PUCCH resources (that is, $n^{(1)}_{PUCCH,0}$ to $n^{(1)}_{PUCCH,3}$) may be occupied in association with each data unit. Multiplexed ACK/NACK is transmitted via one PUCCH resource selected from among the occupied PUCCH resources. $n^{(1)}_{PUCCH,i}$ described in Table 4 indicates PUCCH resources used to transmit ACK/NACK. b(0)b(1) indicates two bits transmitted via the selected PUCCH resource and is modulated using QPSK. For example, if the UE successfully decodes four data units, the UE transmits (1, 1) to the base station via the PUCCH resource connected to $n^{(1)}_{PUCCH,1}$. Since combinations of PUCCH resources and QPSK symbols are not sufficient to indicate all possible ACK/NACK assumptions, NACK and DTX are coupled (NACK/DTX, N/D), except in some cases.

Next, PUSCH piggybacking will be described. Since an LTE UE may not simultaneously transmit a PUCCH and a PUSCH, UCI is multiplexed in a PUSCH region if UCI (e.g., CQI/PMI, HARQ-ACK, RI, etc.) needs to be transmitted in a subframe in which a PUSCH is transmitted.

Figure 8:
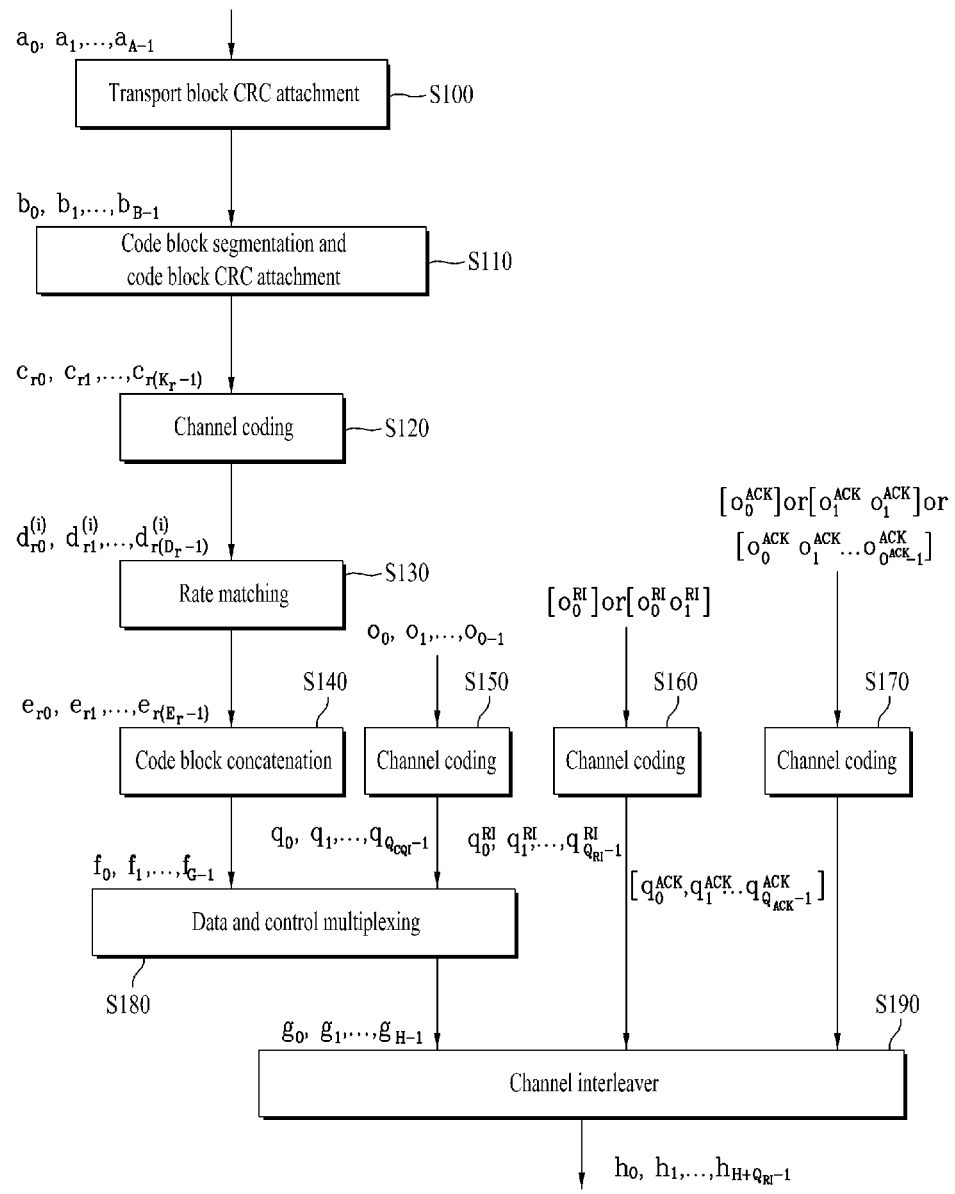
FIG. 8 is a diagram showing a procedure for processing UL-SCH data and control information.

FIG. 8 is a diagram showing a procedure for processing UL-SCH data and control information. For details thereof, refer to 36.212 V8.7.0 (2009.05) 5.2.2.-5.2.2.8.

Referring to FIG. 8, error detection is provided to a UL-SCH transport block (TB) via cyclic redundancy check (CRC) attachment (S100).

All transport blocks are used to calculate CRC parity bits. The bits of the transport blocks are $a_0, a_1, a_2, a_3, \ldots, a_{A-1}$. The parity bits are $p_0, p_1, p_2, p_3, \ldots, p_{L-1}$. The size of the transport block is A and the number of parity bits is L.

After transport block CRC attachment, code block segmentation and code block CRC attachment are performed (S110). Bits input for code block segmentation are $b_0, b_1, b_2, b_3, \ldots, b_{B-1}$. B denotes the number of bits of the transport block (including CRC). The bits after code block segmentation are $c_{r0}, c_{r1}, c_{r2}, c_{r3}, \ldots, c_{r(K_r-1)}$. r denotes a code block number (r=0, 1, . . . , C−1) and Kr denotes the number of bits of the code block r. C denotes a total number of code blocks.

Channel coding is performed after code block segmentation and code block CRC (S120). Bits after channel coding are $d_{r0}^{(i)}, d_{r1}^{(i)}, d_{r2}^{(i)}, d_{r3}^{(i)}, \ldots, d_{r(D_r-1)}^{(i)}$. i=0, 1, 2 and $D_r$ denotes the number of bits of an i-th coded stream for the code block r (that is, $D_r=K_r+4$). r denotes a code block number (r=0, 1, . . . , C−1) and Kr denotes the number of bits of the code block r. C denotes a total number of code blocks. For channel coding, turbo coding may be used.

Rate matching is performed after channel coding (S130). The bits after rate matching are $e_{r0}, e_{r1}, e_{r2}, e_{r3}, \ldots, e_{r(E_r-1)}$. $E_r$ denotes the number of bits subjected to rate matching of an r-th code block. r=0, 1, . . . , C−1 and C denotes a total number of code blocks.

Code block concatenation is performed after rate matching (S140). The bits after code block concatenation are $f_0, f_1, f_2, f_3, \ldots, f_{G-1}$. G denotes a total number of coded bits for transmission. If control information is multiplexed with UL-SCH transmission, bits used to transmit control information are not included in G. $f_0, f_1, f_2, f_3, \ldots, f_{G-1}$ correspond to a UL-SCH codeword.

In case of UCI, channel coding of channel quality information (CQI and/or PMI) $o_0, o_1, \ldots o_{o-1}$, RI($[o_0^{RI}]$ or $[o_0^{RI} o_1^{RI}]$) and HARQ-ACK ($[o_0^{ACK}]$, $[o_0^{ACK} o_1^{ACK}]$ or $[o_0^{ACK} o_1^{ACK} \ldots o_{o^{ACK}-1}^{ACK}]$) is independently performed (S150 to S170). Channel coding of UCI is performed based on the number of coded symbols for control information. For example, the number of coded symbols may be used for rate matching of coded control information. The number of coded symbols corresponds to the number of modulation symbols, the number of REs, etc. in a subsequent process.

Channel coding of HARQ-ACK is performed using an input bit sequence $[o_0^{ACK}]$, $[o_0^{ACK} o_1^{ACK}]$ or $[o_0^{ACK} o_1^{ACK} \ldots o_{o^{ACK}-1}^{ACK}]$ of step S170. $[o_0^{ACK}]$ and $[o_0^{ACK} o_1^{ACK}]$ denote 1-bit HARQ-ACK and 2-bit HARQ-ACK, respectively. In addition, $[o_0^{ACK} o_1^{ACK} \ldots o_{o^{ACK}-1}^{ACK}]$ indicates HARQ-ACK composed of information of two or more bits (That is, $O^{ACK}>2$). ACK is coded into 1 and NACK is coded into 0. In case of 1-bit HARQ-ACK, repetition coding is used. In case of 2-bit HARQ-ACK, a (3,2) simplex code is used and encoded data may be cyclically repeated. In case of HARQ-ACK of 3 or more bits, a (32, O) block code is used. More specifically, referring to channel coding of control information of 36.212 V8.7.0 (2009.05) 5.2.2.6, in case of HARQ-ACK of 3 or more bits (that is, $[o_0^{ACK} o_1^{ACK} \ldots o_{o^{ACK}-1}^{ACK}]$), a channel-coded bit sequence $q_0^{ACK}, q_1^{ACK}, q_2^{ACK}, \ldots, q_{Q_{ACK}-1}^{ACK}$ is obtained using the following equation. $Q_{ACK}$ denotes a total number of channel-coded bits.

$$q_i^{ACK} = \sum_{n=0}^{O^{ACK}-1} (O_n^{ACK} \cdot M_{(i\bmod 32),n}) \bmod 2 \qquad \text{Equation 2}$$

$q_i^{ACK}$ denotes an i-th channel-coded bit, i denotes an integer of 0 to $Q_{ACK}$-1, mod denotes a modulo operation, and M denotes the following block code. $Q_{ACK}=Q'_{ACK} \times Q_m$, $Q'_{ACK}$ denotes the number of coded symbols for HARQ-ACK, and $Q_m$ is a modulation order. $Q_m$ is set equally to UL-SCH data.

Table 5 shows Reed-Muller code defined in an LTE system.

TABLE 5

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 0 | 0 | 1 | 0 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 0 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

Input of a data/control multiplexing block is $f_0$, $f_1$, $f_2$, $f_3$, ..., $f_{G-1}$ indicating coded UL-SCH bits and $q_0$, $q_1$, $q_2$, $q_3$, ..., $q_{Q_{CQI}-1}$ indicating coded CQI/PMI bits (S180). Output of the data/control multiplexing block is $g_0$, $g_1$, $g_2$, $g_3$, ..., $g_{H'-1}$. $g_i$ denotes a column vector having a length of $Q_m$ (i= 0, ..., H'−1). $H'=H/Q_m$ and $H=(G+Q_{CQI})$ H denotes a total number of coded bits allocated for UL-SCH data and CQI/PMI.

Input of a channel interleaver is output of the data/control multiplexing blocks $g_0$, $g_1$, $g_2$, ..., $g_{H'-1}$, coded rank indicators $q_0^{RI}$, $q_1^{RI}$, $q_2^{RI}$, ..., $q_{Q'_{RI}-1}^{RI}$ and coded HARQ-ACK $q_0^{ACK}$, $q_1^{ACK}$, $q_2^{ACK}$, ..., $q_{Q'_{ACK}-1}^{ACK}$ (S190). $g_i$ denotes a column vector having a length of $Q_m$ for CQI/PMI and i= 0, ..., H'−1 (H'=H/$Q_m$). $q_i^{ACK}$ denotes a column vector having a length $Q_m$ for ACK/NACK and i=0, ..., $Q'_{ACK}$−1 ($Q'_{ACK}=Q_{ACK}/Q_m$). $q_i^{RI}$ denotes a column vector having a length of $Q_m$ for RI and i=0, ... $Q'_{RI}$−1 ($Q'_{RI}=Q_{RI}/Q_m$).

A channel interleaver multiplexes control information and UL-SCH data for PUSCH transmission. More specifically, the channel interleaver performs a process of mapping control information and UL-SCH data to a channel interleaver matrix corresponding to PUSCH resources.

After channel interleaving, a bit sequence $h_0$, $h_1$, $h_2$, ..., $h_{H+Q_{RI}-1}$ read from a channel interleaver matrix row by row is output. The read bit sequence is mapped on a resource grid. $H''=H'+Q_{RI}'$ modulation symbols are transmitted via a subframe.

Figure 9:
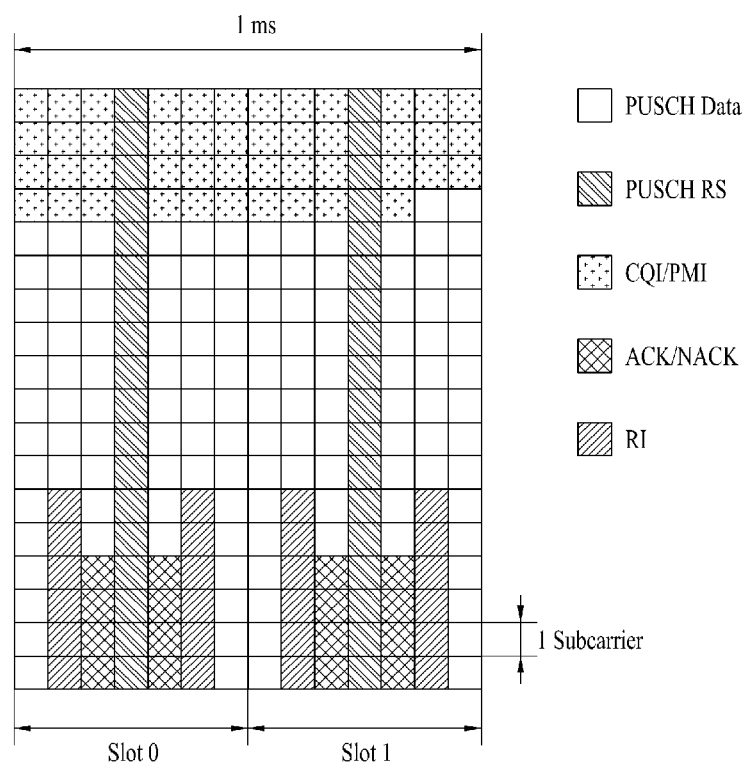
FIG. 9 is a diagram illustrating multiplexing of control information and UL-SCH data on a PUSCH.

FIG. 9 is a diagram illustrating multiplexing of control information and UL-SCH data on a PUSCH. If control information is transmitted on a subframe to which PUSCH transmission is allocated, the UE multiplexes control information (UCI) and UL-SCH data before DFT spreading. The control information includes at least one of CQI/PMI, HARQ, ACK/NACK and RI. The number of REs used for CQI/PMI, ACK/NACK and RI transmission is based on a modulation and coding scheme (MCS) and offset values $\Delta_{offset}^{CQI}$, $\Delta_{offset}^{HARQACK}$ and $\Delta_{offset}^{RI}$ allocated for PUSCH transmission. The offset values allow different coding rates according to control information and are semi-statically set via higher layer (e.g., radio resource control (RRC)) signaling. The UL-SCH data and the control data are not mapped to the same RE. The control information is mapped to two slots of a subframe.

Referring to FIG. 9, CQI and/or PMI resources are located at a start portion of UL-SCH data resources, are sequentially mapped to all SC-FDMA symbols on one subcarrier and then are mapped to a next subcarrier. CQI/PMI is mapped in a subcarrier from the left to the right, that is, in ascending order of SC-FDMA symbol indices. PUSCH data (UL-SCH data) is subjected to rate matching in consideration of the amount of CQI/PMI resources (that is, the number of coded symbols). The same modulation order as the UL-SCH data is used for CQI/PMI. ACK/NACK is inserted into some SC-FDMA resources, to which UL-SCH data is mapped, via puncturing. ACK/NACK is located beside an RS and is filled with SC-FDMA symbols from bottom to top, that is, in ascending order of subcarrier indices. In the case of a normal CP, as shown, SC-FDMA symbols for ACK/NACK are located at SC-FDMA symbol #2/#5 in each slot. In a subframe, coded RI is located beside a symbol for ACK/NACK regardless of whether ACK/NACK is actually transmitted or not.

In LTE(-A), control information (e.g., QPSK modulation use) may be scheduled for transmission on a PUSCH without UL-SCH data. Control information (CQI/PMI, RI and/or ACK/NACK) is multiplexed before DFT spreading in order to maintain a low cubic metric (CM) single-carrier property. Multiplexing ACK/NACK, RI and CQI/PMI is similar to that shown in FIG. 7. An SC-FDMA symbol for ACK/NACK is located beside an RS and resources to which CQI is mapped may be punctured. The number of REs for ACK/NACK and RI is based on a reference MCS (CQI/PMI MCS) and an offset parameter ($\Delta_{offset}^{CQI}$, $\Delta_{offset}^{HARQACK}$ or $\Delta_{offset}^{RI}$). The reference MCS is calculated from CQI payload size and resource allocation. Channel coding and rate matching for control signaling without UL-SCH data are equal to channel coding and rate matching for control signaling with UL-SCH data.

Figure 10:
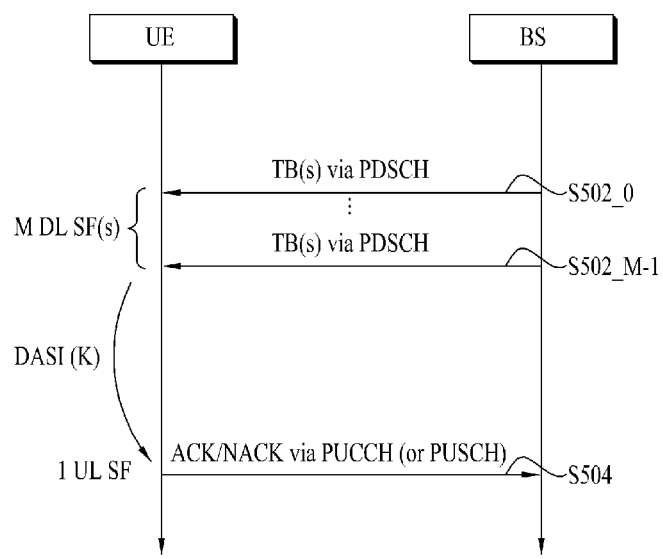
FIG. 10 is a diagram showing a TDD uplink acknowledgement/negative acknowledgement (UL ACK/NACK) transmission process in a single cell situation.

FIG. 10 is a diagram showing a TDD uplink acknowledgement/negative acknowledgement (UL ACK/NACK) transmission process in a single cell situation.

Referring to FIG. 10, a UE may receive one or more PDSCH signals on M DL subframes (SFs) (S502_0 to S502_M−1). Each PDSCH signal is used to transmit one or a plurality (e.g., two) of transport blocks (TBs) (or codewords (CW)) according to transmission mode. Although not shown, in steps S502_0 to S502_M−1, PDCCH signals requiring an ACK/NACK response, for example, PDCCH signals indicating semi-persistent scheduling release (briefly SPS release PDCCH signals) may also be received. If the PDSCH signals and/or SPS release PDCCH signals are present in the M DL subframes, the UE transmits ACK/NACK via one UL subframe corresponding to the M DL subframes through a procedure necessary to transmit ACK/NACK (e.g., ACK/NACK (payload) generation, ACK/NACK resource allocation, etc.) (S504). ACK/NACK includes reception response information of the PDSCH signals and/or SPS release PDCCH signals of steps S502_0 to S502_M−1. Although ACK/NACK is generally transmitted via a PUCCH (e.g., see FIGS. 6 to 7), ACK/NACK may be transmitted via a PUSCH (e.g., see FIGS. 8 to 9) if a PUSCH is transmitted when ACK/NACK is transmitted. For ACK/NACK transmission, various PUCCH formats of Table 2 may be used. In addition, in order to reduce the number of ACK/NACK bits transmitted via the PUCCH format, various methods such as ACK/NACK bundling or ACK/NACK channel selection may be used.

As described above, in TDD, ACK/NACK for data received on the M DL subframes is transmitted via one UL subframe (that is, M DL SF(s):1 UL SF) and a relationship therebetween is given by a downlink association set index (DASI).

Table 6 shows a DASI (K: {$k_0$, $k_1$, ... $k_{M-1}$}) defined in LTE(-A). Table 6 shows a gap between the UL subframe for transmitting ACK/NACK and the DL subframe associated therewith. More specifically, if the PDSCH and/or the SPS release PDCCH is transmitted on subframe n−k (k□K), the UE transmits ACK/NACK on subframe n.

TABLE 6

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |

TABLE 6-continued

| UL-DL Configuration | 0 | 1 | 2 | 3 | 4 | 5 | 6 | 7 | 8 | 9 |
|---|---|---|---|---|---|---|---|---|---|---|
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The case of configuring usage of a subframe according to an uplink-downlink traffic state in a TDD based LTE system will be described.

In an uplink-downlink (UL-DL) configuration of a TDD radio frame, the structure of a subframe is semi-statically fixed. However, recently, in order to increase data transmission efficiency, attempts have been made to dynamically or semi-dynamically reconfigure a UL-DL configuration of a TDD radio frame, that is, subframe configuration/usage, according to UL-DL traffic state. For example, based on a UL-DL configuration (e.g., Table 2), a method of switching a subframe configured as downlink or uplink to a subframe for uplink or downlink transmission is considered.

More specifically, in case of uplink (U)=>downlink (D) reconfiguration, UL/DL grant or data scheduling requiring uplink (e.g., a PUSCH or a PUCCH including ACK/NACK) transmission on a subframe may be omitted to fake the legacy UEs, such that uplink (e.g., a PUSCH or a PUCCH including ACK/NACK) transmission from legacy UEs is not performed in the subframe reconfigured as D. Thus, DL data is transmitted to a future UE in the subframe reconfigured as D.

The future UE is differentiated from the legacy UE. In a TDD wireless communication system, assume that a subframe configuration and signal transmission/reception are performed based on the UL-DL configuration for the legacy UE, and a specific subframe may be reconfigured (D=>U or U=>D). In the present specification, one future is referred to as a UE unless stated otherwise.

However, since reconfiguration (e.g., U=>D) is performed in subframe units in a conventional subframe reconfiguration method, if UL transmission on the subframe reconfigured as D is suppressed, scheduling restriction may occur not only with respect to the UE but also with respect to the future UE. For example, in order to suppress UL ACK/NACK transmission on a subframe N reconfigured as D, DL scheduling corresponding to a subframe N-k may be restricted to UL-DL configuration. That is, although U is borrowed into D for the purpose of adapting to increase in DL traffic load, DL scheduling of another downlink subframe may be restricted.

Hereinafter, the present invention proposes a method of efficiently reconfiguring a subframe and a signal transmission process in order to solve the above-described problems. More specifically, a method of reconfiguring a part of an uplink subframe configured based on a UL-DL configuration is proposed. More specifically, in the present invention, when the subframe configured based on the UL-DL configuration is reconfigured (U=>D or D=>L), only a part of the subframe need be reconfigured. As another example, in the present invention, when the subframe configured based on the UL-DL configuration is reconfigured (U=>D or D=>L), the subframe may be reconfigured to include U and D.

For convenience, a method of reconfiguring uplink subframes as D, that is, reconfiguring a part of an uplink subframe as downlink will be described.

Figure 11:
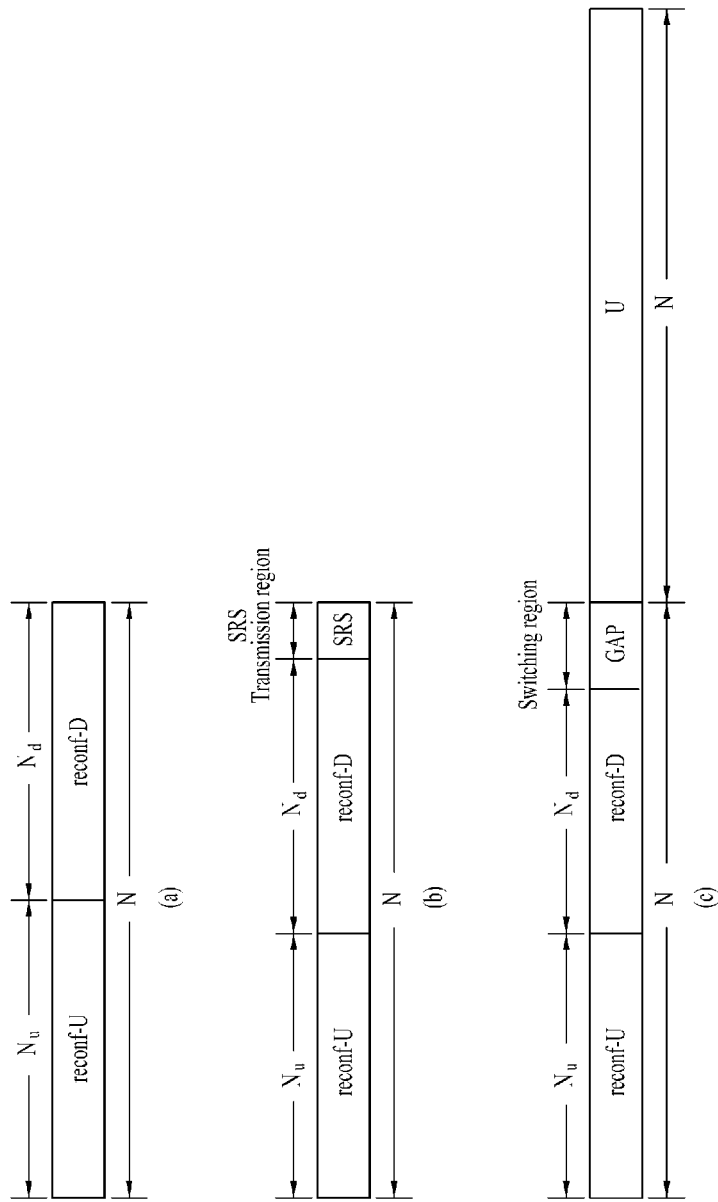
FIG. 11 is a diagram showing a subframe configured according to an embodiment of the present invention.

FIG. 11 is a diagram showing a structure in which a part of an uplink subframe is reconfigured according to an embodiment of the present invention.

For convenience, assume that an entire length (of a time dimension) of a subframe is N, a length of a reconf-U region is $N_u$ and a length of a reconf-D region is $N_d$. In this case, $N \geq N_u + N_d$. That is, the reconf-U region and the reconf-D region may be configured to overlap each other over the entire region of the subframe ($N = N_u + N_d$) (a), or may be configured except for a part of the subframe according to the order of the reconf-U region and the reconf-D region in the subframe, whether the subframe is configured for SRS transmission and whether a next subframe is U or D ($N > N_u + N_d$).

Referring to FIG. 11(a), the subframe may be configured to be divided into the region (reconf-U) configured as a UL region in a front portion of the subframe and the region (reconf-D) configured as a DL region in a rear portion of the subframe. Preferably, reconf-U and reconf-D may be configured in units of one slot. As shown in FIG. 11(a), by locating the uplink region in the front portion of the subframe and locating the downlink region in the rear portion of the subframe, restrictions such as switching gap time are not required upon downlink-to-uplink switching.

For example, if the lengths of the subframe, the reconf-U region and the reconf-D region are expressed by the number of symbols, in the case of a normal CP, N may be 14 symbols, $N_u$ may be 7 symbols and $N_d$ may be 7 symbols. In this case, reconf-U and recon-D correspond to first and second slots of the subframe, respectively. Here, the symbols may be changed according to a multiple access scheme and include OFDMA symbols and SC-FDMA symbols. In LTE(-A), since SC-FDMA symbols are used in UL and OFDMA symbols are used in DL, $N_u$ may correspond to 7 SC-FDMA symbols and $N_d$ may correspond to 7 OFDMA symbols.

As shown in FIG. 11(b), in case of a subframe N in which an SRS transmission region is configured, a reconf-U region is located in a front portion of the subframe and a reconf-D region is located in a rear portion of the subframe, the region of the subframe excluding the SRS transmission region is preferably divided into $N_u$ and $N_d$.

Alternatively, as shown in FIG. 11(c), in case of a subframe N in which a reconf-U region is located in a front portion of the subframe and a reconf-D region is located in a rear portion of the subframe, if a next subframe N+1 is U, transmission and reception are switched from downlink to uplink. Accordingly, for uplink transmission of the subframe N+1 (e.g., a switching region for transmission start timing), the region of the subframe N excluding predetermined symbols is preferably divided into $N_u$ and $N_d$.

$N_u$ and $N_d$ may be signaled via broadcast/RRC/L1/L2 signaling, a UL grant PDCCH scheduling reconf-U or a DL grant PDCCH scheduling reconf-D.

The UE may transmit an uplink signal (e.g., PUSCH, PUSCH including UCI such as ACK/NACK or SRS) in the reconf-U region and receive a downlink signal (e.g., PDSCH, PDCCH, PHICH, PCFICH or CRS) in the reconf-D region.

Accordingly, according to one embodiment of the present invention, if PUSCH or ACK/NACK transmission is required via an uplink subframe (before reconfiguration), the UE may transmit an uplink signal in the reconf-U region of the subframe after reconfiguration. Accordingly, if the uplink subframe N is reconfigured, UL/DL grant or data scheduling is possible in the downlink subframe N-k. Since the UE may receive a downlink signal in the reconf-D region of the subframe, downlink resources may be adaptively managed in correspondence with increase in traffic load.

The UE according to the embodiment of the present invention may transmit a data signal (e.g., a PUSCH signal) in the reconf-U region. Although the UE may transmit the data signal in a region of a maximum length of $N_u$ on the time axis, the UE may transmit the data signal using $N_u$-1 SC-FDMA symbols in consideration of SRS transmission (if it is assumed that SRS have a length of one symbol).

As another example, the UE may transmit a PUCCH in the reconf-U region. Since use of the second slot is restricted due to reconf-D, the PUCCH may have a length of a maximum of one slot (seven symbols in the normal CP case or six symbols if one symbol is excluded due to SRS). In a normal case, PUCCH format 1a/1b is repeatedly transmitted in slot units within one subframe for transmit diversity gain. However, since the PUCCH transmitted in the reconf-U region is transmitted on only one slot, transmit diversity gain is decreased and thus probability of an ACK/NACK error at a receiver may be increased. Accordingly, in order to prevent performance deterioration due to transmission of the PUCCH in one slot, UCI (e.g., ACK/NACK) may be transmitted in the reconf-U region using two PUCCH resources (indices) (e.g., $n^{(1)}_{PUCCH}$).

In this case, two PUCCH resources may be explicitly or implicitly allocated via higher layer signaling (e.g., RRC signaling). For example, the two PUCCH resources (indices) may be explicitly allocated or the PUCCH resources may be implicitly allocated to be linked to a lowest CCE index $n_{CCE}$ and/or $n_{CCE}$+1 among the CCE indices used for PDCCH transmission (see Equation 1).

Alternatively, if $N_u$ is less than the length of one slot (if an SRS transmission region is included, the length of the SRS transmission region is excluded from the length of one slot), PUCCH transmission may not be allowed in reconf-U. Since an existing PUCCH format 1a/1b slot structure includes 7(6) symbols according to CP, if the reconf-U region is less than one slot, the existing PUCCH format 1a/1b structure may not be used. In this case, although a method of transmitting the PUCCH using available symbols may be considered, probability that the base station fails to decode the PUCCH signal and ACK/NACK errors occur is increased.

Further, PUCCH transmission may not be allowed in reconf-U regardless of $N_u$. In this case, UCI (e.g., ACK/NACK) may be transmitted in reconf-U via the PUSCH. That is, in the reconf-U region, ACK/NACK may be transmitted only via the PUSCH scheduled to the reconf-U region. In this example, the PUSCH scheduled to the reconf-U region is used to multiplex uplink data and/or ACK/NACK as in existing LTE or is used to transmit only ACK/NACK. In the latter case, PUSCH resources for ACK/NACK may be predetermined via higher layer signaling (e.g., RRC signaling). For example, the PUSCH resources (indices) may be explicitly allocated via RRC signaling in advance or a plurality of PUSCH resources (indices) may be allocated to RRC and PUSCH resources (indices) to be used for ACK/NACK transmission among the plurality of allocated PUSCH resources (indices) may be indicated via a DL grant PDCCH. Alternatively, when the reconfigured subframe index is N, a method of linking a specific PUSCH resource (index) among the DL grant PDCCH resources (indices) at the subframe N-k to implicitly allocate PUSCH resources for ACK/NACK is also possible. In this case, if PUSCH resources (indices) explicitly or implicitly allocated to the subframe are not present, transmission of the generated ACK/NACK signal may be abandoned or the ACK/NACK signal may be dropped such that the ACK/NACK signal is not transmitted.

In addition, in one implementation for preventing UCI from being transmitted in the reconf-U region via the PUCCH, the UE may perform a channel resource allocation process for UCI on the assumption that the PUSCH is always allocated to reconf-U. As another implementation, assume that a UL grant PDCCH scheduling PUSCH transmission in reconf-U is received from the base station (eNB). By such assumption, ACK/NACK may be transmitted only via the PUSCH regardless of actual PUSCH allocation. That is, if the UE fails to detect the UL grant PDCCH, transmission of ACK/NACK may be abandoned without transmitting ACK/NACK using the PUCCH, or ACK/NACK may be delayed and transmitted via an uplink subframe after reconf-U. Preferably, the UE may delay ACK/NACK via an uplink subframe most adjacent to the reconf-U and transmit ACK/NACK to the base station (e.g., eNB).

If the UE transmits the SRS signal in the reconf-U region, the SRS signal may be transmitted in a state of being located at a last symbol of the reconf-U region.

According to one embodiment of the present invention, in TDD, even when the uplink subframe is reconfigured to support downlink, DL grant or data scheduling requiring ACK/NACK transmission to the UE via the subframe is possible and an uplink signal including ACK/NACK information may be transmitted via the reconf-U region. Accordingly, it is possible to solve the problem that downlink data scheduling requiring ACK/NACK transmission to the UE in the network via the subframe is restricted.

In addition, the UE may receive a downlink signal (e.g., a PDSCH) in the reconf-D region. For example, the PDSCH signal may have a length of a maximum of $N_d$ on the time axis or may have a length less than $N_d$ in consideration of the case in which the control channel is transmitted. In order to enable the PDSCH to maximally use $N_d$, scheduling information of the PDSCH transmitted in reconf-D may be semi-statically signaled via higher layer signaling (e.g., RRC signaling) in advance or may be dynamically configured via a DL grant PDCCH transmitted via a specific downlink subframe before reconf-D. In addition, a last index of an orthogonal frequency division multiplexing (OFDM) symbol on which the PDSCH is received in reconf-D may be changed depending upon whether the subframe is configured for sounding reference signal (SRS) transmission. For example, if the subframe is not configured for SRS transmission, the index of the OFDM symbol for PDSCH reception may be determined equally to the index of the last OFDM symbol of the subframe. However, if the subframe is configured for SRS transmission, the index of the OFDM symbol for PDSCH reception is preferably set to the index of the OFDM symbol excluding the symbol corresponding to the SRS transmission region from the last OFDM symbol of the subframe.

In addition, if a next subframe of reconf-D is uplink, the last index of the OFDM symbol on which the PDSCH is received in reconf-D may be configured to include a switching gap time for transmission/reception switching between the reconf-D region and the next uplink subframe. In this case, in the switching gap time region, downlink propagation delay, uplink transmission start timing, etc. may be considered.

In one embodiment of the present invention, an uplink subframe is reconfigured as a subframe in which the reconf-D region is arranged next to the reconf-U region. Similarly, the uplink subframe may be reconfigured as a subframe in which the reconf-U region is arranged next to the reconf-D region. If the reconf-U region is arranged next to the reconf-D region, the transmission/reception switching gap time for switching from downlink to uplink may be included between the reconf-D region and the reconf-U region. Information about the switching gap time may be additionally signaled and information about the switching gap time may be indirectly confirmed via N, $N_u$ and $N_d$.

The reconfiguration method of the subframe structure according to one embodiment of the present invention is applicable to a subframe configured as downlink or a subframe which is not configured as uplink or downlink in advance.

Figure 12:
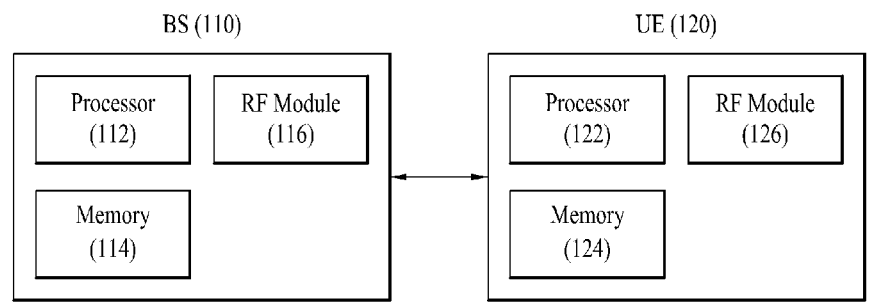
FIG. 12 is a diagram showing a base station and a user equipment (UE) to which an embodiment of the present invention is applicable.

FIG. 12 is a diagram showing a base station and a user equipment (UE) to which an embodiment of the present invention is applicable. If a wireless communication system includes a relay, communication in a backhaul link is performed between the BS and the relay and communication in an access link is performed between the relay and the UE. Accordingly, the BS and UE shown in FIG. 12 may be replaced with the relay according to situation.

Referring to FIG. 12, a wireless communication system includes a BS 110 and a UE 120. The BS 110 includes a processor 112, a memory 114, and a Radio Frequency (RF) unit 116. The processor 112 may be configured so as to implement the procedures and/or methods proposed in the present invention. The memory 114 is connected to the processor 112 and stores various pieces of information related to operations of the processor 112. The RF unit 116 is connected to the processor 112 and transmits and/or receives RF signals. The UE 120 includes a processor 122, a memory 124, and an RF unit 126. The processor 122 may be configured so as to implement the procedures and/or methods proposed in the present invention. The memory 124 is connected to the processor 122 and stores various pieces of information related to operations of the processor 122. The RF unit 126 is connected to the processor 122 and transmits and/or receives RF signals. The BS 110 and/or the UE 120 may have a single antenna or multiple antennas.

The embodiments of the present invention described hereinabove are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is obvious that claims that are not explicitly cited in each other in the appended claims may be presented in combination as an embodiment of the present invention or included as a new claim by subsequent amendment after the application is filed.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although an example of applying a method and apparatus for transmitting and receiving a signal between a user equipment and a base station in a wireless communication system to a 3GPP LTE system has been described, the present invention is applicable to various wireless communication systems in addition to the 3GPP LTE system.

The invention claimed is:

1. A method of configuring a subframe in a time division duplexing (TDD) wireless communication system, the method comprising:
receiving reconfiguration information indicating a specific subframe being reconfigured, wherein the specific subframe is one of one or more uplink subframes based on a TDD uplink-downlink configuration; and
reconfiguring the specific subframe based on the reconfiguration information,
wherein when the specific subframe is reconfigured to use for both an uplink transmission and a downlink transmission, a first resource region for the uplink transmission is allocated before a second resource region for the downlink transmission.

2. The method according to claim 1, further comprising:
transmitting an acknowledgement (ACK)/negative ACK (NACK) signal by using two physical uplink control channel (PUCCH) resources allocated to the first resource region.

3. The method according to claim 1, further comprising:
transmitting an acknowledgement (ACK)/negative ACK (NACK) by using physical uplink shared channel (PUSCH) resources pre-allocated to the specific subframe according to high layer signaling.

4. The method according to claim 1, further comprising:
receiving a physical downlink shared channel (PDSCH) in the second region,
wherein an index of a last orthogonal frequency division multiplexing (OFDM) symbol on which the PDSCH is received in the second region is changed depending upon whether the specific uplink subframe is configured for sounding reference signal (SRS) transmission.

5. An apparatus for configuring a subframe in a time division duplexing (TDD) wireless communication system, the apparatus comprising:
a radio frequency (RF) unit; and
a processor,
wherein the processor is configured to:
receive reconfiguration information indicating a specific subframe being reconfigured, and
reconfigure the specific subframe based on the reconfiguration information,
wherein the specific subframe is one of one or more uplink subframes based on a TDD uplink-downlink configuration, and wherein when the specific subframe is reconfigured to use for both an uplink transmission and a downlink transmission, a first resource region for the uplink transmission is allocated before a second resource region for the downlink transmission.

6. The apparatus according to claim 5, wherein the processor is further configured to transmit an acknowledgement (ACK)/negative ACK (NACK) signal by using two physical uplink control channel (PUCCH) resources allocated to the first resource region.

7. The apparatus according to claim 5, wherein the processor is further configured to transmit an acknowledgement (ACK)/negative ACK (NACK) signal by using physical uplink shared channel (PUSCH) resources pre-allocated to the specific subframe according to high layer signaling.

8. The apparatus according to claim 5, wherein the processor is further configured to receive a physical downlink shared channel (PDSCH) in the second region, and
wherein an index of a last orthogonal frequency division multiplexing (OFDM) symbol on which the PDSCH is received in the second region is changed depending upon whether the specific uplink subframe is configured for sounding reference signal (SRS) transmission.

* * * * *